(12) United States Patent
Blalock (10) Patent No.: US 8,047,689 B2
(45) Date of Patent: Nov. 1, 2011

(54) AIR-TITE COMPACT FLUORESCENT LAMP PLATE

(75) Inventor: Robert Allan Blalock, Peachtree City, GA (US)

(73) Assignee: Cooper Technologies Company, Houston, TX (US)

( * ) Notice: Subject to any disclaimer, the term of this patent is extended or adjusted under 35 U.S.C. 154(b) by 265 days.

(21) Appl. No.: 12/424,872

(22) Filed: Apr. 16, 2009

(65) Prior Publication Data

US 2010/0265726 A1    Oct. 21, 2010

(51) Int. Cl.
*F21V 15/00* (2006.01)
(52) U.S. Cl. ........................ 362/365; 362/362
(58) Field of Classification Search ............... 362/365, 362/362
See application file for complete search history.

(56) References Cited

U.S. PATENT DOCUMENTS

| | | | | |
|---|---|---|---|---|
| 5,662,413 A | * | 9/1997 | Akiyama | 362/365 |
| 2008/0198611 A1 | * | 8/2008 | Kinnune et al. | 362/404 |
| 2010/0002451 A1 | * | 1/2010 | Reynolds | 362/363 |

* cited by examiner

*Primary Examiner* — Evan Dzierzynski
(74) *Attorney, Agent, or Firm* — King & Spalding LLP (57) ABSTRACT

A lamp subassembly includes an air-tight plate, a mounting lamp holder coupled to the air-tight plate, and a mounting spring coupled to the air-tight plate and the mounting lamp holder. The lamp subassembly is coupled to a trim with the mounting spring and coupled to a lamp with the mounting lamp holder to form a lighting fixture. The air-tight plate is coupled to a top opening located on the trim and forms an air-tight interface therebetween. The mounting lamp holder positions the lamp at least partially within the trim. The air leakage through the air-tight interface is equal to or less than two cubic feet per minute at a seventy-five Pascal pressure difference.

25 Claims, 5 Drawing Sheets

AIR-TITE COMPACT FLUORESCENT LAMP PLATE

TECHNICAL FIELD

The present invention relates generally to lighting fixtures, and more particularly, to an air-tight plate for reducing or preventing air leakage through a top opening of the lighting fixture.

BACKGROUND

Incandescent lamps have been in use for over one hundred years, and remain in widespread use. These incandescent lamps, although relatively inexpensive and easy to replace, are not very efficient at generating light. As the demand for and the cost of generating electricity has risen over the years, utility companies and governmental agencies have began promoting the use of more efficient ways to generate light. Compact fluorescent lamps generate light more efficiently than incandescent lamps. A compact fluorescent lamp generates the equivalent light output of an incandescent lamp by using only one-quarter to one-third the amount of electricity.

The Energy Star program, a joint effort of the U.S. Department of Energy and the Environmental Protection Agency, says that if the five most frequently used light fixtures or lamps in each American home were changed to compact fluorescent lamps, energy costs would drop by at least $6.5 billion per year. This equates to a savings of about $60 per year per household. In addition, the energy savings would prevent greenhouse gases equal to the emissions from more than 8 million cars.

Certain states have enacted energy codes regulating lighting fixtures so that air leakage from the air conditioned space below the ceiling to the unconditioned space located above the ceiling is reduced. For example, The Washington State Energy Code requires recessed lighting fixtures to restrict measured air leakage to less than two cubic feet per minute ("cfm") at seventy-five Pascals ("Pa") pressure difference, tested according to a test method set forth in ASTM International Standard E-283.

For incandescent lamps, the requirements set forth in The Washington State Energy Code, as mentioned above, have been achieved by snapping a standard ceramic incandescent socket into the top of a trim via a spring. This configuration restricts air flow through the top opening of the trim. However, due to the size of the current standard fluorescent socket, which has a GU24 base, no one has yet conceived a solution to restrict air flow through the top opening of the trim when using a compact fluorescent lamp. For this reason, the benefits achievable from using compact fluorescent lamps have not been realized.

In view of the foregoing there is a need in the art for reducing air leakage through the top opening of a trim. Additionally, there is a need in the art for reducing air leakage through a lighting fixture to less than two cfm at seventy-five Pascal pressure difference, tested according to a test method set forth in ASTM International Standard E-283. Further, there exists a need in the art for providing an air-tight plate that is coupled to the top opening of a trim to thereby reduce air leakage from the top opening of the trim.

SUMMARY

One embodiment comprises a luminaire having a trim, an air-tight plate, and a lamp. The trim has a top opening and the lamp is positioned at least partially within the trim. The air-tight plate has a first end and a second end, where the second end forms an air-tight interface when coupled to the top opening of the trim. The air-tight interface allows air leakage of 2 cubic feet per minute or less at a 75 Pascal pressure difference.

According to another embodiment, a lamp subassembly has an air-tight plate, a mounting lamp holder, and a mounting spring. The air-tight plate has a first end and a second end, wherein the first end and the second end form a wire connector aperture extending through the air-tight plate. The mounting lamp holder has a plate coupling end coupled to the second end of the air-tight plate and a lamp coupling end coupled to a lamp. The mounting spring is coupled to the first end of the air-tight plate.

In another embodiment, the air-tight plate has a first end having a first surface and a second end having a second surface. A first bridge hole is formed at one end of the first surface, while a second bridge hole is formed at an opposite end of the first surface. The first bridge hole and the second bridge hole both extend from the first end to the second end. Additionally, the first end and the second end are formed with at least one wire connector aperture extending from the first end to the second end.

BRIEF DESCRIPTION OF THE DRAWINGS

The foregoing and other features and aspects of the invention may be best understood with reference to the following description of certain exemplary embodiments of the invention, when read in conjunction with the accompanying drawings, wherein.

The drawings illustrate only exemplary embodiments of the invention and are therefore not to be considered limiting of its scope, as the invention may admit to other equally effective embodiments.

BRIEF DESCRIPTION OF EXEMPLARY EMBODIMENTS

The present invention is directed to lighting fixtures. In particular, the present invention is directed to an air-tight plate for reducing or preventing air leakage though a top opening of the lighting fixture. Although the description of exemplary embodiments of the invention are provided below in conjunction with a compact fluorescent lamp, alternative embodiments of the invention may be applicable to other types of lamps having smaller socket sizes when compared to the standard incandescent lamp socket.

The invention may be better understood by reading the following description of non-limiting, exemplary embodiments with reference to the attached drawings, wherein like parts of each of the figures are identified by the same reference characters, and which are briefly described as follows.

Figure 1:
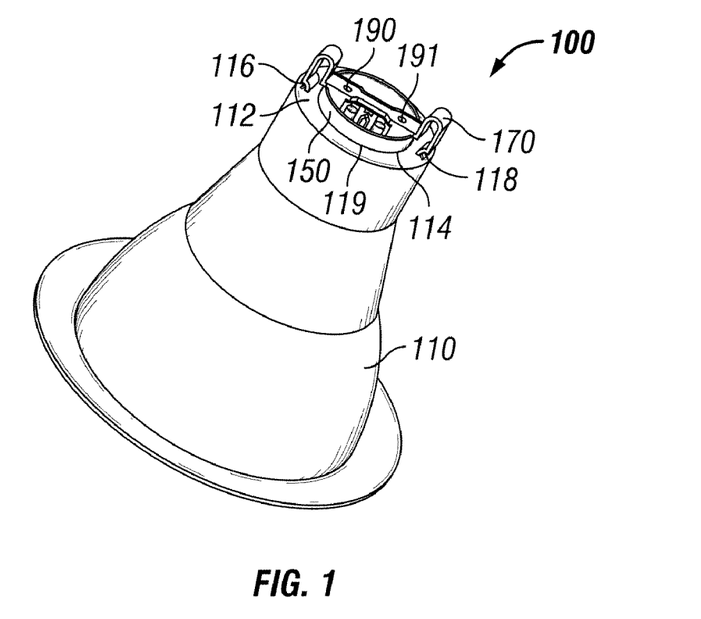
FIG. 1 shows a perspective view of a luminaire having an air-tight plate in accordance with an exemplary embodiment.

FIG. 1 shows a perspective view of a luminaire 100 having an air-tight plate 150 in accordance with an exemplary embodiment. Referring now to FIG. 1, the luminaire 100 includes a trim 110, a mounting lamp holder 310 (FIG. 3), an air-tight plate 150, and a mounting spring 170. The trim 110 has a top surface 112 with a top opening 114, a first attaching means 116, and a second attaching means 118. In one exemplary embodiment, the first and second attaching means 116, 118 are keyholes or slots. The top opening 114 has a generally circular shape. The first attaching means 116 and the second attaching means 118 are positioned on opposing sides of the top surface 112 with the top opening 114 located therebetween. The first attaching means 116 and the second attaching means 118 are typically disposed at a desired distance away from the circumference of the top opening 114 on the top surface 112. According to the exemplary embodiment of FIG. 1, the first attaching means 116 is a first keyhole, or first slot, and the second attaching means 118 is a second keyhole, or second slot. Although FIG. 1 shows that the first attaching means 116 and the second attaching means 118 is positioned at a desired distance away from the circumference of the top opening 114, alternatively, the first attaching means 116 and the second attaching means 118 are disposed as part of the top opening 114 without departing from the scope and spirit of the exemplary embodiment. Also, although the top opening 114 has a generally circular shape, in alternative embodiments the top opening 114 has any geometric shape including, but not limited to, rectangular, square, and triangular without departing from the scope and spirit of the exemplary embodiment.

The trim 110 forms a cavity (not shown) within its interior side. A compact fluorescent lamp 350 (FIG. 3) and the mounting lamp holder 310 (FIG. 3) are coupled together and positioned within this cavity. As previously mentioned, although a compact fluorescent lamp 350 (FIG. 3) is described as the lamp used in this embodiment, alternative embodiments may use different lamp types, other than an Edison screw lamp, without departing from the scope and spirit of the exemplary embodiment.

Trim 110 is illustrated in FIG. 1 having a generally conical shape that is not air-tight and has three sections. Although trim 110 has been illustrated as having a generally conical shape, in alternative embodiments the trim has any shape including, but not limited to, cylindrical, parabolic, and rectangular without departing from the scope and spirit of the exemplary embodiment. Additionally, although trim 110 has been illustrated as not being air-tight, in alternative embodiments the trim is air-tight without departing from the scope and spirit of the exemplary embodiment. The trim 110 can be fabricated in an air-tight manner by fabricating it in one piece or in multiple pieces such that the air gap between the multiple pieces are eliminated. Trim 110 is manufactured from any material known to those of ordinary skill in the art including, but not limited to, metal, metal alloy, plastic, polymer, and rubber without departing from the scope and spirit of the exemplary embodiment.

Figure 3:
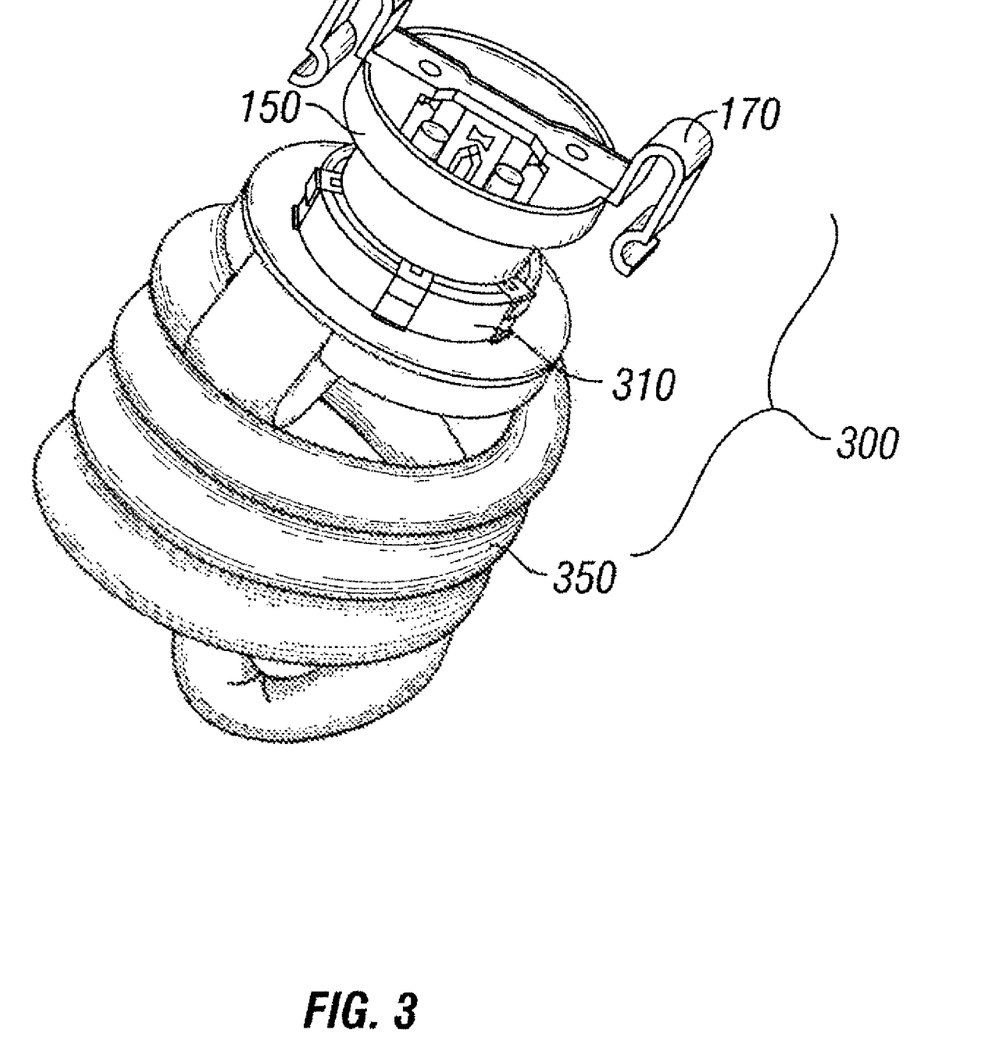
FIG. 3 shows a perspective view of a lamp subassembly coupled to a compact fluorescent lamp in accordance with an exemplary embodiment.

As seen in FIG. 1, the air-tight plate 150 is coupled to the mounting spring 170 with a first screw 190 and a second screw 191. First screw 190 and second screw 191 also couple the air-tight plate 150 to the mounting lamp holder 310 (FIG. 3). The mounting spring 170 also is coupled to the first attaching means 116 and the second attaching means 118 such that the interface between the air-tight plate 150 and the top opening 114 forms an air-tight interface 119, wherein air leakage through the air-tight interface 119 is equal to or less than two cfm at a seventy-five Pa pressure difference. According to another exemplary embodiment, the air leakage through the air-tight interface 119 is equal to or less than 1.5 cfm at a seventy-five Pa pressure difference. According to yet another exemplary embodiment, the air leakage through the air-tight interface 119 is equal to or less than one cfm at a seventy-five Pa pressure difference.

Figure 2:
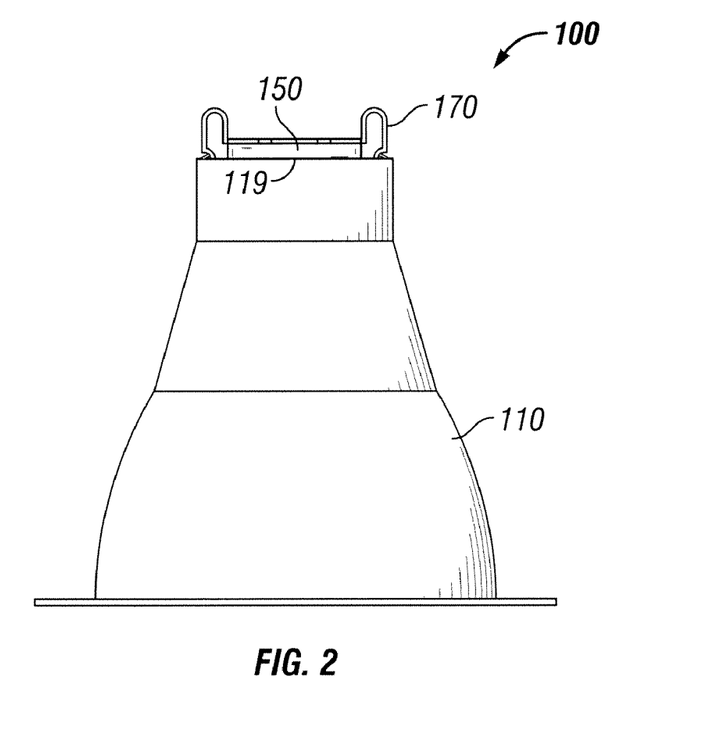
FIG. 2 shows a side view of the luminaire of FIG. 1 in accordance with an exemplary embodiment.

FIG. 2 shows a side view of the luminaire 100 of FIG. 1 in accordance with an exemplary embodiment. Referring to FIG. 2, the mounting spring 170 is coupled to the air-tight plate 150 and the trim 110, wherein the air-tight interface 119 is formed between the air-tight plate 150 and the trim 110.

Figure 4A:
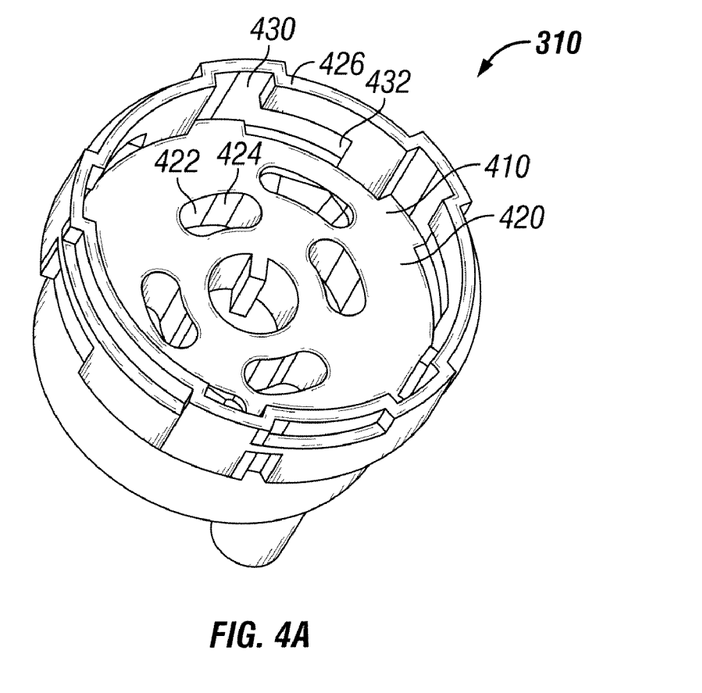
FIG. 4A shows a perspective view of a mounting lamp holder when viewed from a lamp coupling end of the mounting lamp holder in accordance with an exemplary embodiment.

FIG. 3 shows a perspective view of a lamp subassembly 300 coupled to a compact fluorescent lamp 350 in accordance with an exemplary embodiment. Referring to FIG. 3, the lamp subassembly 300 includes the mounting lamp holder 310, the air-tight plate 150, and the mounting spring 170. As shown in FIG. 3, the mounting spring 170 is coupled to the air-tight plate 150 and the air-tight plate 150 is coupled to the mounting lamp holder 310. The compact fluorescent lamp 350 is releasably coupled to the mounting lamp holder 310 through the use of a pin junction 424 (FIG. 4A). Although the compact fluorescent lamp 350 is coupled to the mounting lamp holder 310 with a pin junction 424 (FIG. 4A), alternate connection types known to those of ordinary skill in the art, for example, screw type junctions, can be substituted without departing from the scope and spirit of the exemplary embodiment.

FIG. 4A shows a perspective view of a mounting lamp holder 310 when viewed from a lamp coupling end 410 of the mounting lamp holder 310 in accordance with an exemplary embodiment. Now referring to FIG. 4A, the lamp coupling end 410 has a generally circular shape. Although the exemplary lamp coupling end 410 has a generally circular shape, alternatively, the lamp coupling end 410 can be configured in any geometric shape, including, but not limited to, rectangular, square, and triangular without departing from the scope and spirit of the exemplary embodiment.

The lamp coupling end 410 has a lamp coupling surface 420 and one or more mounting apertures 422 disposed within the lamp coupling surface 420. The lamp coupling surface 420 is recessed within the lamp coupling end 410, thereby forming a raised lamp support wall 426 surrounding the perimeter of the lamp coupling surface 420. The raised lamp support wall 426 provides support to the compact fluorescent lamp 350 (FIG. 3) when coupled to the lamp coupling end 410 of the mounting lamp holder 310. Additionally, the raised lamp support wall 426 provides for a locking mechanism 430 that prevents the compact fluorescent lamp 350 (FIG. 3) from being decoupled unintentionally from the lamp coupling end 410. Optionally, the lamp coupling surface 420 includes at least one vent hole 432 to allow the heat generated from the compact fluorescent lamp 350 (FIG. 3) to escape the interior side of the lamp coupling end 410 into an area located between the exterior side of the lamp coupling end 410 and the interior side of the trim 110 (FIG. 1). According to some exemplary embodiments, vent hole 432 is located within or approximate to the locking mechanism 430. The exemplary embodiment of FIG. 4A shows five vent holes 432 positioned circumferentially around the lamp coupling surface 420. Although five vent holes are shown in this embodiment, alternate embodiments can have greater or fewer vent holes without departing from the scope and spirit of the exemplary embodiment. Additionally, although FIG. 4A depicts a recessed lamp coupling surface 420 forming the raised lamp support wall 426, in an alternative exemplary embodiment the lamp coupling surface 420 is not recessed, without departing from the scope and spirit of the exemplary embodiment.

The mounting apertures 422 are positioned within the lamp coupling surface 420. Each of these mounting apertures 422 includes a pin junction 424 positioned at one end of the mounting apertures 422. The mounting apertures 422 are shaped to receive pins (not shown) from the compact fluorescent lamp 350 (FIG. 3) and are used for coupling the compact fluorescent lamp 350 (FIG. 3) to the lamp coupling end 410 and for positioning the compact fluorescent lamp 350 (FIG. 3) within the trim 110 (FIG. 1). Some terms used in the industry to refer to this connection type include, but are not limited to, "twist and lock," "twist-n-lock," and "twist-n-click." The pins each enter one of the mounting apertures 422 and are rotated to couple with each of the pin junctions 424. According to the exemplary embodiment shown, there are four pins coupled to the compact fluorescent lamp 350 (FIG. 3). The spacing of the mounting apertures 422 is dependent upon the spacing of the pins. Although four pin junctions 424 are shown in the exemplary embodiment of FIG. 4A, alternate exemplary embodiments have greater or fewer pin junctions without departing from the scope and spirit of the exemplary embodiment. Additionally, although the exemplary embodiment employs pin junctions 424 as a tool for coupling the compact fluorescent lamp 350 (FIG. 3) to the lamp coupling end 410, alternate coupling techniques including, but not limited to, screw connections can be used without departing from the scope and spirit of the exemplary embodiment.

Figure 4B:
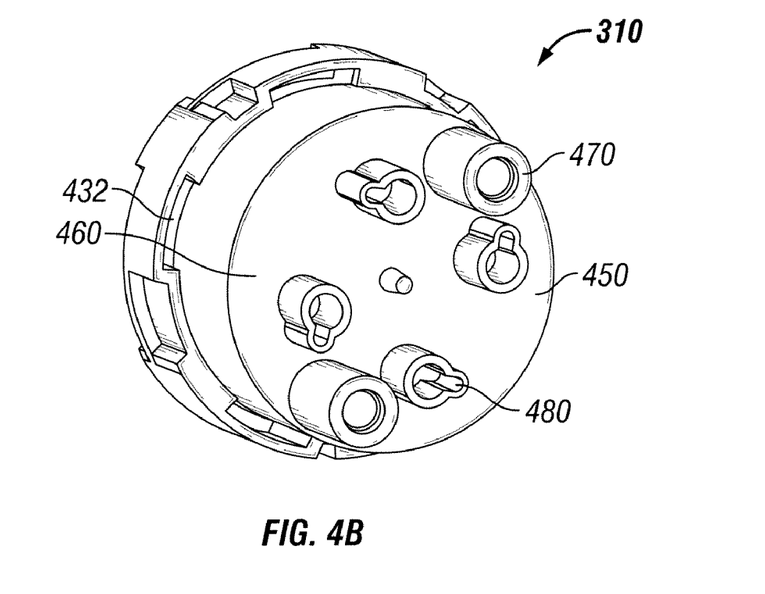
FIG. 4B shows a perspective view of the mounting lamp holder of FIG. 4A when viewed from a plate coupling end of the mounting lamp holder in accordance with an exemplary embodiment.

FIG. 4B shows a perspective view of the mounting lamp holder 310 of FIG. 4A when viewed from a plate coupling end 450 of the mounting lamp holder 310 in accordance with an exemplary embodiment. Referring now to FIG. 4B, the plate coupling end 450 has a generally circular shape. Although the exemplary plate coupling end 450 has a generally circular shape, the plate coupling end 450 can alternatively have any geometric shape, including but not limited to, rectangular, square, and triangular without departing from the scope and spirit of the exemplary embodiment.

The plate coupling end 450 includes a plate coupling surface 460, at least two screw bosses 470 extending outwardly from the plate coupling end 450, and at least two wire connectors 480 also extending outwardly from the plate coupling end 450. The screw bosses 470 are positioned on opposing sides, at or near the perimeter of the plate coupling surface 460. Additionally, the screw bosses 470 are threaded on their interior side so that they accept a screw 190, 191 (FIG. 1) for coupling the mounting spring 170 (FIG. 3) to the air-tight plate 150 (FIG. 3) and the air-tight plate 150 (FIG. 3) to the mounting lamp holder 310. Although the exemplary embodiment illustrates screw bosses 470 for coupling the mounting spring 170 (FIG. 3), the air-tight plate 150 (FIG. 3), and the mounting lamp holder 310 to each other, other devices including, but not limited to, a snapping device and rivets can be used to couple the mounting spring 170 (FIG. 3), the air-tight plate 150 (FIG. 3), and the mounting lamp holder 310 to each other without departing from the scope and spirit of the exemplary embodiment.

The wire connectors 480 are positioned within the interior portion of the plate coupling surface 460, but typically not directly beneath a raised bridge 540 (FIG. 5A) formed on the air-tight plate 150 (FIG. 5A) when the air-tight plate 150 (FIG. 5A) is coupled to the mounting lamp holder 310. Additionally, each of these wire connectors 480 has a wire fastener (not shown) positioned at the bottom of the wire connector 480. The wire fasteners (not shown) accept electrical wires (not shown) that provide power to the compact fluorescent lamp 350 (FIG. 3). Additionally, the wire fasteners communicate electricity to the pin junctions 424 (FIG. 4A). Each wire connector 480 extends outwardly from the plate coupling surface 460 to a distance that is typically less than the distance of the screw bosses 470 extending outwardly from the plate coupling surface 460. Although the exemplary embodiment shows four wire connectors 480, alternate embodiments include greater or fewer wire connectors without departing from the scope and spirit of the exemplary embodiment. Additionally, according to alternate exemplary embodiments, the two wire connectors 480 are positioned on the plate coupling surface 460 and do not extend outwardly from the plate coupling surface 460, without departing from the scope and spirit of the exemplary embodiment.

As seen in FIG. 4B, the vent hole 432 is visible when viewing the mounting lamp holder 310 from the plate coupling end 450. As previously described, the vent hole 432 allows heat generated from the compact fluorescent lamp 350 (FIG. 3) to escape outside the mounting lamp holder 310.

With respect to the mounting lamp holder 310, all components are typically fabricated from any non-conducting material known to those of ordinary skill in the art including, but not limited to, plastics and polymers, except for the pin junctions 424 (FIG. 4A) and the wire fasteners (not shown) of the wire connectors 480. The pin junctions 424 (FIG. 4A) and the wire fasteners are typically fabricated from any conducting material known to those of ordinary skill in the art including, but not limited to, metals and metal alloys.

Figure 5A:
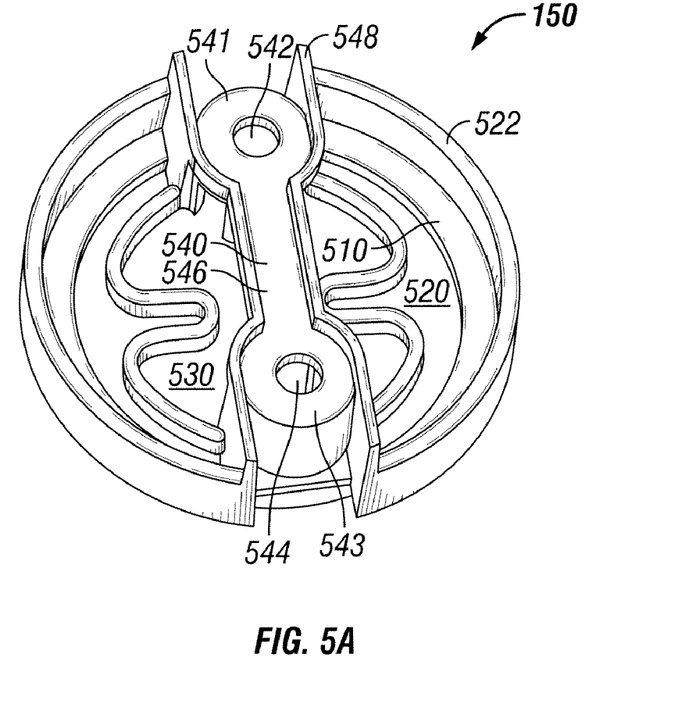
FIG. 5A shows a perspective view of an air-tight plate when viewed from a first end of the air-tight plate in accordance with an exemplary embodiment.

FIG. 5A shows a perspective view of an air-tight plate 150 when viewed from a first end 510 of the air-tight plate 150 in accordance with an exemplary embodiment. Now referring to FIG. 5A, the first end 510 has a generally circular shape. Although the exemplary first end 510 has a generally circular shape, the first end 510 can alternatively have any geometric shape including, but not limited to, rectangular, square, and triangular without departing from the scope and spirit of the exemplary embodiment. The shape of the first end 510 is at least slightly larger than the top opening 114 (FIG. 1) of the trim 110 (FIG. 1) so that the top opening 114 (FIG. 1) is not visible when being viewed from the first end 510 once the first end 510 is coupled to the top opening 114 (FIG. 1).

The first end 510 includes a first surface 520, at least one wire connector aperture 530 disposed within the first surface 520 and extending to a second end 550 (FIG. 5B) of the air-tight plate 150, and a raised bridge 540 extending across the first surface 520. The first surface 520 is recessed within the first end 510 forming a wall 522 surrounding the perimeter of the first surface 520. Although this exemplary embodiment illustrates a recessed first surface 520 forming a wall 522 surrounding the perimeter of the first surface 520, in an alternative exemplary embodiment the first surface 520 is not recessed, without departing from the scope and spirit of the exemplary embodiment.

Within the first surface 520, the wire connector aperture 530 is formed to allow access to the wire connector 480 (FIG. 4B) of the mounting lamp holder 310 (FIG. 4B) from the first end 510. According to this exemplary embodiment, one wire connector aperture 530 provides access to four wire connectors 480 (FIG. 4B) from the first end 510 when the air-tight plate 150 is coupled to the mounting lamp holder 310 (FIG. 4B). According to alternative exemplary embodiments, a corresponding wire connector aperture 530 is formed for each wire connector 480 (FIG. 4B). According to other exemplary embodiments, a wire connector aperture 530 corresponds to two or more wire connectors 480 (FIG. 4B).

Figure 5B:
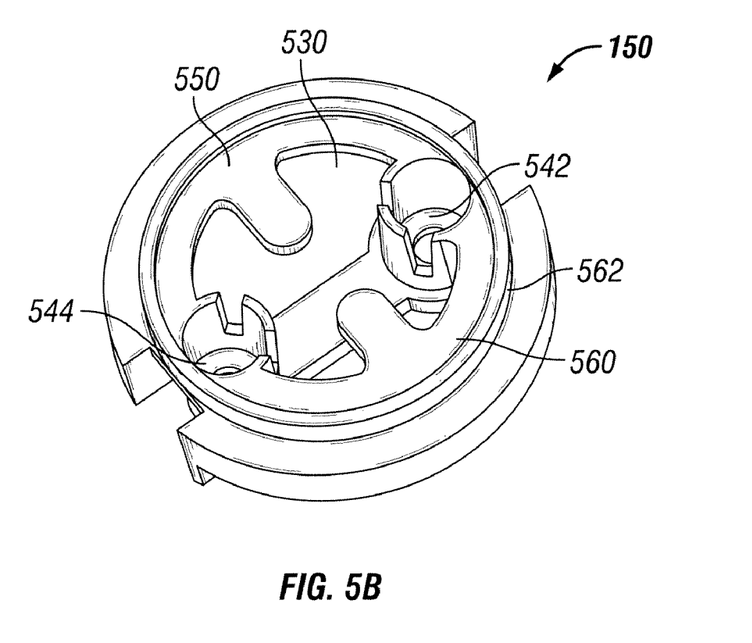
FIG. 5B shows a perspective view of the air-tight plate of FIG. 5A when viewed from a second end of the air-tight plate in accordance with an exemplary embodiment.

As previously mentioned, the raised bridge 540 extends across the first surface 520. The raised bridge 540 positions the mounting spring 170 (FIG. 3) thereon. The raised bridge includes a first portion 541 at one end of the raised bridge 540, a second portion 543 at the opposing end of the raised bridge 540, and a third portion 546 coupling the first portion 541 to the second portion 543. The first portion includes a first bridge hole 542 which extends through to the second end 550 (FIG. 5B) of the air-tight plate 150. Similarly, the second portion 543 includes a second bridge hole 544, which also extends through to the second end 550 (FIG. 5B). The first bridge hole 542 and the second bridge hole 544 are through holes allowing screws 190, 191 (FIG. 1) to couple the mounting spring 170 (FIG. 3), the air-tight plate 150, and the mounting lamp holder 310 (FIG. 3). Although the exemplary embodiment illustrates the first bridge hole 542 and the second bridge hole 544 as through holes, the first bridge hole 542 and the second bridge hole 544 can be threaded internally without departing from the scope and spirit of the exemplary embodiment. Also, the first portion 541 and the second portion 543 can be substantially similar in width, while the third portion 546 has a smaller width than the widths of the first portion 541 and the second portion 543. However, in alternate exemplary embodiments, the first portion 541, the second portion 543, and the third portion have substantially similar widths. According to some exemplary embodiments, the raised bridge 540 optionally further includes a bridge wall 548 extending outwardly around the perimeter of the raised bridge 540.

In an alternate exemplary embodiment, the raised bridge 540 has the third portion 546 removed from it, thereby leaving the first portion 541 and the second portion 543. In this exemplary embodiment, instead of having a single mounting spring 170 (FIG. 3), two or more mounting springs can be used. For example, a first mounting spring is coupled to the first portion 541 and the first attaching means 116 (FIG. 1) and a second mounting spring is coupled to the second portion 543 and the second attaching means 118 (FIG. 1). In other alternative embodiments, additional first portions of the raised bridge are positioned around the perimeter of the first end and corresponding attaching means are positioned on the trim so that additional mounting springs can be coupled to the additional first portions and the corresponding attaching means without departing from the scope and spirit of the exemplary embodiment.

FIG. 5B shows a perspective of the air-tight plate 150 of FIG. 5A when viewed from the second end 550 of the air-tight plate 150 in accordance with an exemplary embodiment. Referring now to FIG. 5B, the second end 550 has a generally circular shape. Although the second end 550 has a generally circular shape, the second end 550 can alternatively have any geometric shape including, but not limited to, rectangular, square, and triangular without departing from the scope and spirit of the exemplary embodiment. The shape of the second end 550 is at least slightly larger than the top opening 114 (FIG. 1) of the trim 110 (FIG. 1) so that the air-tight interface 119 (FIG. 1) is formed between the second end 550 and the top opening 114 (FIG. 1).

The second end 550 includes a second surface 560 having the wire connector aperture 530 and the first bridge hole 542 and the second bridge hole 544 disposed within the second surface 560. The second surface 560 is raised forming a second surface perimeter wall 562. Although this exemplary embodiment employs a raised second surface 560, in an alternative exemplary embodiment the second surface 560 is not raised without departing from the scope and spirit of the exemplary embodiment. The shape of the second surface 560 is at least slightly smaller than the top opening 114 (FIG. 1) of the trim 110 (FIG. 1) so that the second surface 560 extends through the top opening 114 (FIG. 1) and creates the air-tight interface 119 (FIG. 1) between the first end 510 and the top opening 114 (FIG. 1) when the air-tight plate 150 is coupled to the top opening 114 (FIG. 1).

As previously described with respect to the first surface 520 (FIG. 5A), the wire connector aperture 530, the first bridge hole 542, and the second bridge hole 544 extend from the second end 550 to the first end 510 (FIG. 5A). When the mounting lamp holder 310 (FIG. 4B) is coupled to the air-tight plate 150, the screw bosses 470 (FIG. 4B) of the mounting lamp holder 310 (FIG. 4B) engage the first bridge hole 542 and the second bridge hole 544.

With respect to the air-tight plate 150, all components of the air-tight plate 150 is fabricated from any non-conducting material known to those of ordinary skill in the art including, but not limited to, plastics and polymers.

Figure 6:
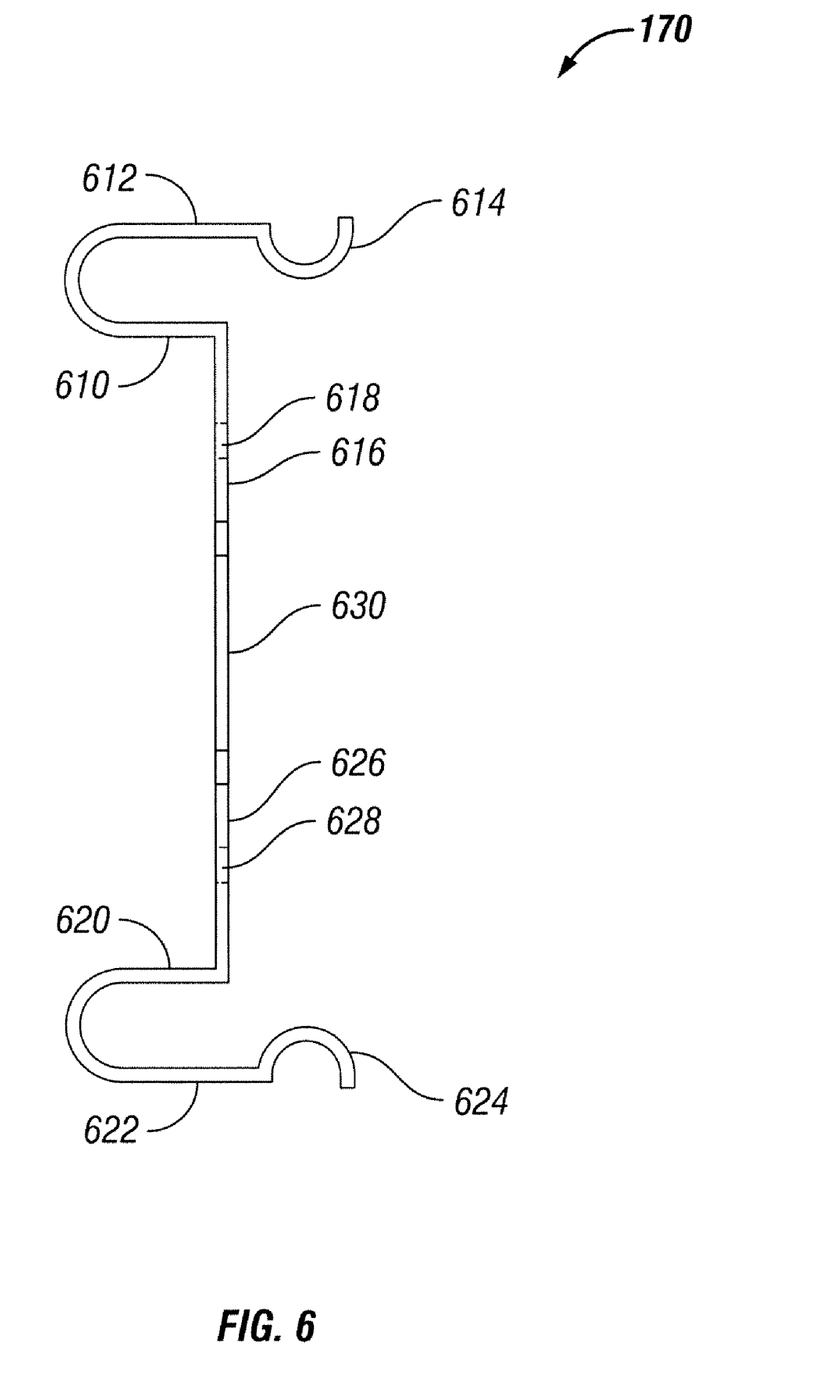
FIG. 6 shows a side view of a mounting spring in accordance with an exemplary embodiment.

FIG. 6 shows a side view of a mounting spring 170 in accordance with an exemplary embodiment. Referring now to FIG. 6, the mounting spring 170 includes a first hook end 610, a second hook end 620, and a middle portion 630 located between the first hook end 610 and the second hook end 620. The first hook end 610 has a first outer end 612 and a first inner end 616. The first outer end 612 has a first hook clamp 614, while the first inner end 616 has a first through hole 618. Similarly, the second hook end 620 has a second outer end 622 and a second inner end 626. The second outer end 622 has a second hook clamp 624, while the second inner end 626 has a second through hole 628. According to the exemplary embodiment shown in FIG. 6, the middle portion 630 has a smaller width than the widths of the first hook end 610 and the second hook end 620. Although this exemplary embodiment illustrates the middle portion 630 having a smaller width than the widths first hook end 610 and the second hook end 620, in alternative exemplary embodiments the middle portion 630 has a width greater than or equal to the widths of the first hook end 610 and the second hook end 620, without departing from the scope and spirit of the exemplary embodiment. Similarly, the first hook end 610 and the second hook end 620 can also have differing widths without departing from the scope and spirit of the exemplary embodiment.

Referring to FIGS. 1-6, the mounting spring 170 is positioned on the raised bridge 540 formed across the first end 510 of the air-tight plate 150 when coupling the mounting spring 170 to the air-tight plate 150, the mounting lamp holder 310, and the trim 110. The first through hole 618 and the second through hole 628 of the mounting spring 170 align with the first bridge hole 542 and the second bridge hole 544 of the air-tight plate 150, which also align with the screw bosses 470 of the mounting lamp holder 310. The first outer end 612 is coupled to the first attaching means 116, the second outer end 622 is coupled to the second attaching means 118, and the first inner end 616, the second inner end 626, and the middle portion 630 are coupled to the first end 510 of the air-tight plate 150. As illustrated in FIG. 1, the mounting spring 170 is coupled to the raised bridge 540 using screws 191, 192.

As previously mentioned, alternate exemplary embodiments have one or more mounting springs that do not traverse the air-tight plate 150 from one side to an opposing side. Thus, mounting spring 170 does not have the middle portion 630. Additionally, a person of ordinary skill in the art having the benefit of the present disclosure will recognize that many other suitable means exist for coupling or releasably coupling the mounting spring 170 to the air-tight plate 150 and to the trim 110 including, but not limited to, adhesives, screws, tabs and slots, and rivets.

Although the invention has been described with reference to specific embodiments, these descriptions are not meant to be construed in a limiting sense. Various modifications of the disclosed embodiments, as well as alternative embodiments of the invention will become apparent to persons of ordinary skill in the art upon reference to the description of the invention. It should be appreciated by those of ordinary skill in the art that the conception and the specific embodiments disclosed may be readily utilized as a basis for modifying or designing other structures or methods for carrying out the same purposes of the invention. It should also be realized by those of ordinary skill in the art that such equivalent constructions do not depart from the spirit and scope of the invention as set forth in the appended claims. It is therefore, contemplated that the claims will cover any such modifications or embodiments that fall within the scope of the invention.

What is claimed is:

1. A luminaire, comprising:
   a trim having a top surface comprising a top aperture;
   an air-tight plate coupled to the trim at the top aperture with a mounting spring and comprising a first end and a second end, the second end coupled to the top aperture of the trim to form an air-tight interface; and
   a lamp positioned at least partially within the trim,
   wherein the mounting spring extends across a bridge formed across the first end of the air-tight plate, and
   wherein air leakage through the air-tight interface is equal to or less than two cubic feet per minute at a seventy-five Pascal pressure difference.

2. The luminaire of claim 1, wherein the second end and the top aperture have a similar geometric shape.

3. The luminaire of claim 1, wherein the mounting spring comprises a first hook end, a second hook end, and a middle portion located between the first hook end and the second hook end.

4. The luminaire of claim 3, wherein the middle portion has a width smaller than the first hook end and the second hook end.

5. The luminaire of claim 3, wherein the first hook end comprises a first outer end and a first inner end, the first outer end comprising a first hook clamp and the first inner end comprising a first aperture, and wherein the second hook end comprises a second outer end and a second inner end, the second outer end comprising a second hook clamp and the second inner end comprising a second aperture.

6. The luminaire of claim 5, wherein the top surface further comprises a first attaching means and a second attaching means, the first attaching means and the second attaching means disposed on opposing sides of the top surface with the top aperture located therebetween, and wherein the first outer end is coupled to the first attaching means, the second outer end is coupled to the second attaching means, and the first inner end, the second inner end, and the middle portion are coupled to the first end of the air-tight plate.

7. The luminaire of claim 6, wherein the first attaching means is a first slot and the second attaching means is a second slot.

8. The luminaire of claim 1, further comprising a mounting lamp holder comprising a plate coupling end and a lamp coupling end, the plate coupling end coupled to the second end of the air-tight plate and the lamp coupling end coupled to the lamp, wherein the mounting lamp holder positions the lamp within the trim.

9. The luminaire of claim 8, wherein the mounting lamp holder comprises at least one wire connectors, each of the at least one wire connector configured to receive an electrical wire.

10. The luminaire of claim 9, wherein the at least one wire connector extends outwardly from the plate coupling end and through a wire connector aperture formed within the second end of the air-tight plate.

11. The luminaire of claim 8, wherein the mounting lamp holder further comprises at least one screw boss, the at least one screw boss preventing rotation of the air-tight plate, each of the at least one screw boss being coupled to the air-tight plate and a mounting spring.

12. The luminaire of claim 8, wherein the mounting lamp holder is coupled to the lamp via a pin junction.

13. The luminaire of claim 1, wherein the lamp is a compact fluorescent lamp.

14. The luminaire of claim 1, wherein air leakage through the air-tight interface is equal to or less than 1.5 cubic feet per minute at a seventy-five Pascal pressure difference.

15. The luminaire of claim 1, wherein air leakage through the air-tight interface is equal to or less than one cubic feet per minute at a seventy-five Pascal pressure difference.

16. A lamp subassembly, comprising:
    an air-tight plate comprising a first end and a second end, wherein the first end and the second end form a wire connector aperture extending through the air-tight plate;
    a mounting lamp holder comprising a plate coupling end and a lamp coupling end, the plate coupling end coupled to the second end of the air-tight plate and the lamp coupling end coupled to a lamp; and
    a mounting spring coupled to the first end of the air-tight plate;
    wherein the air-tight plate further comprises a raised bridge disposed across the first end and wherein the mounting spring is positioned on the raised bridge.

17. The lamp subassembly of claim 16, wherein the mounting spring comprises a first hook end, a second hook end, and a middle portion located between the first hook end and the second hook end.

18. The lamp subassembly of claim 17, wherein the middle portion has a width less than the first hook end and the second hook end.

19. The lamp subassembly of claim 17, wherein the first hook end comprises a first outer end and a first inner end, the first outer end comprising a first hook clamp and the first inner end comprising a first aperture, and wherein the second hook end comprises a second outer end and a second inner end, the second outer end comprising a second hook clamp and the second inner end comprising a second aperture.

20. The lamp subassembly of claim 16, wherein the mounting lamp holder comprises at least one wire connector accessible from the wire connector aperture of the air-tight plate, each of the at least one wire connector configured to receive an electrical wire.

21. The lamp subassembly of claim 16, wherein the mounting lamp holder further comprises at least one screw boss, the at least one screw boss preventing rotation of the air-tight plate, each of the at least one screw boss being coupled to the air-tight plate and the mounting spring.

22. The lamp subassembly of claim 16, wherein the lamp coupling end comprises a pin junction.

23. An air-tight plate, comprising:
a first end comprising a first surface, the first surface comprising a first bridge hole at one end and a second bridge hole at an opposite end; and
a second end comprising a second surface,
wherein the first bridge hole and the second bridge hole extend from the first end to the second end, and
wherein the first end and the second end are formed with at least one wire connector aperture extending from the first end to the second end.

24. The air-tight plate of claim 23, further comprising a raised bridge member disposed across the first end, the raised bridge member comprising the first bridge hole and the second bridge hole.

25. The air-tight plate of claim 23, wherein the second surface is a raised second surface and is smaller than the second end.

* * * * *